United States Patent [19]

Hardy

[11] 4,004,871
[45] Jan. 25, 1977

[54] MOLD GATE APPARATUS

[76] Inventor: Claude Hardy, 35268 Bennett, Livonia, Mich. 48152

[22] Filed: Apr. 3, 1975

[21] Appl. No.: 564,728

Related U.S. Application Data

[63] Continuation of Ser. No. 339,642, March 12, 1973, abandoned.

[52] U.S. Cl. .................... 425/243; 425/245 R; 425/247
[51] Int. Cl.² .......................................... B29F 1/03
[58] Field of Search ............ 425/243, 244, 245 R, 425/247, DIG. 224, DIG. 227; 249/105

[56] References Cited

UNITED STATES PATENTS

| | | | |
|---|---|---|---|
| 3,553,788 | 1/1971 | Putkowski | 425/243 |
| 3,591,897 | 7/1971 | Perras | 425/243 |
| 3,632,260 | 1/1972 | Moslo | 425/245 |
| 3,740,179 | 6/1973 | Schmidt | 425/247 |
| 3,797,984 | 3/1974 | Yago et al. | 425/243 |
| 3,819,312 | 6/1974 | Arpajian | 425/243 |

*Primary Examiner*—Francis S. Husar
*Assistant Examiner*—Carl A. Rowold
*Attorney, Agent, or Firm*—Lon H. Romanski

[57] ABSTRACT

A mold gate has a conduit formed therein for the flow of fluid moldable plastic material; the conduit for the most part is maintained at a relatively low temperature while a portion of such conduit is exposed to be acted upon by a source of higher temperature; the portion of such conduit so exposed to higher temperature is positioned as to be in at least close proximity to an associated mold cavity.

14 Claims, 6 Drawing Figures

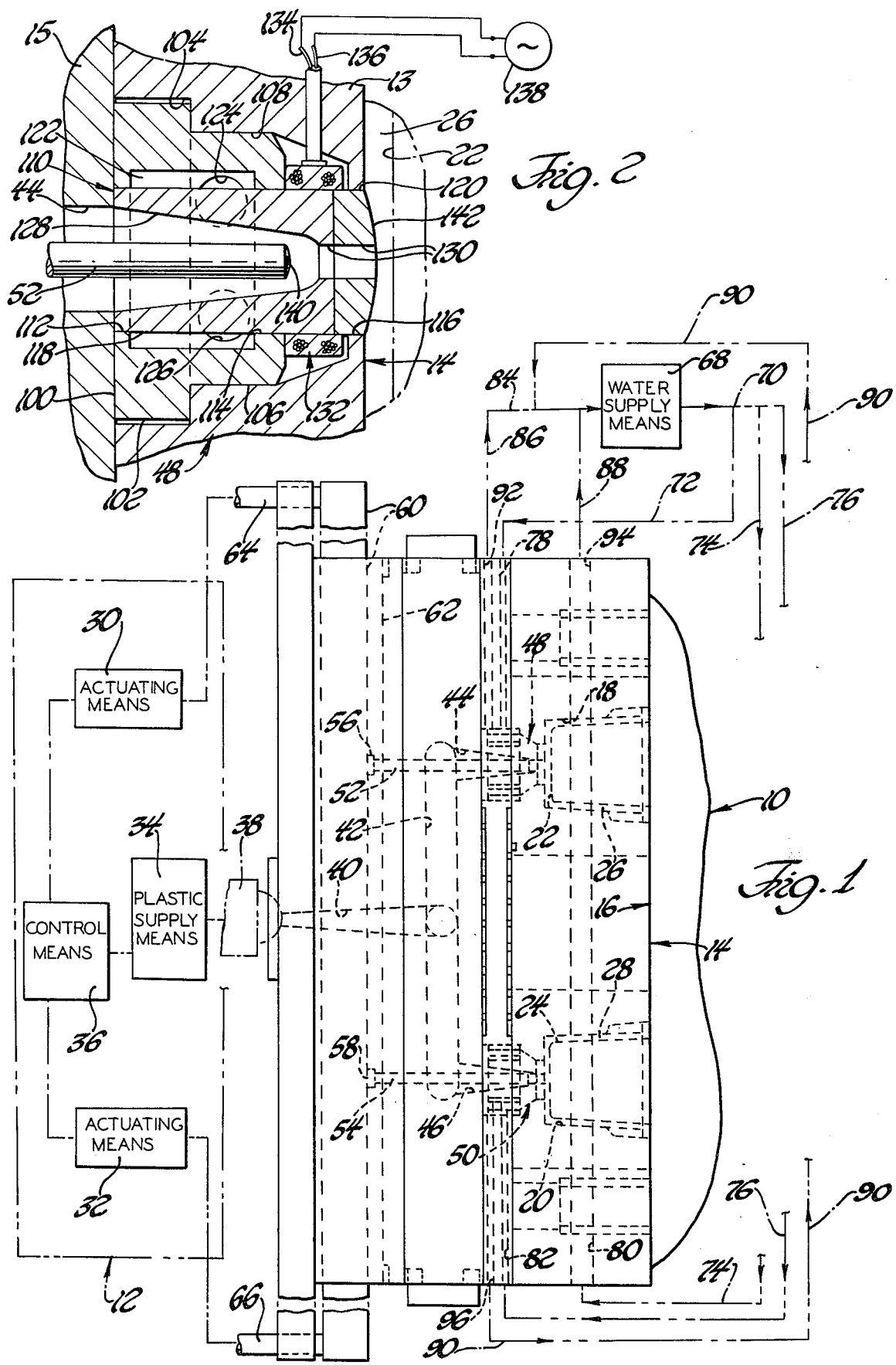

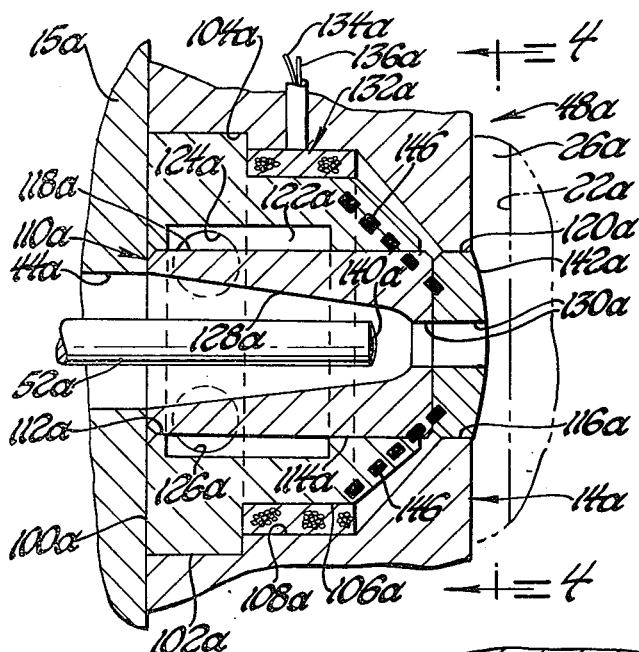
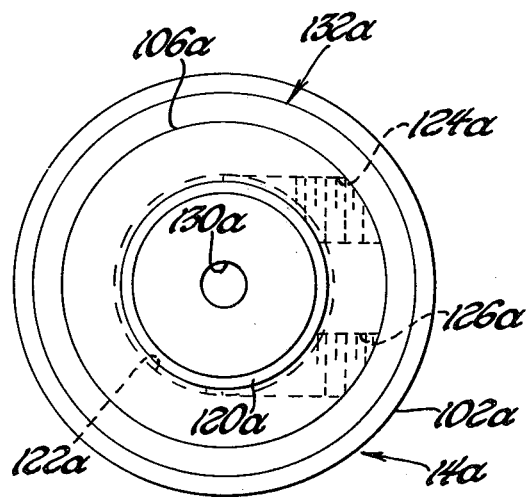
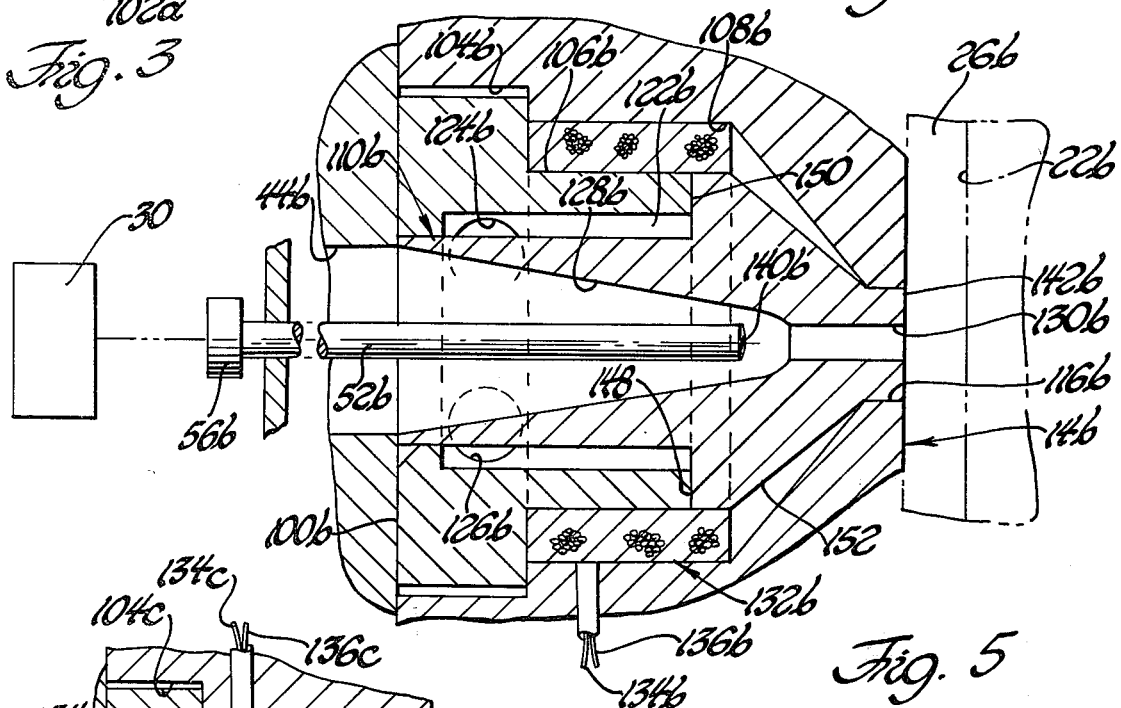
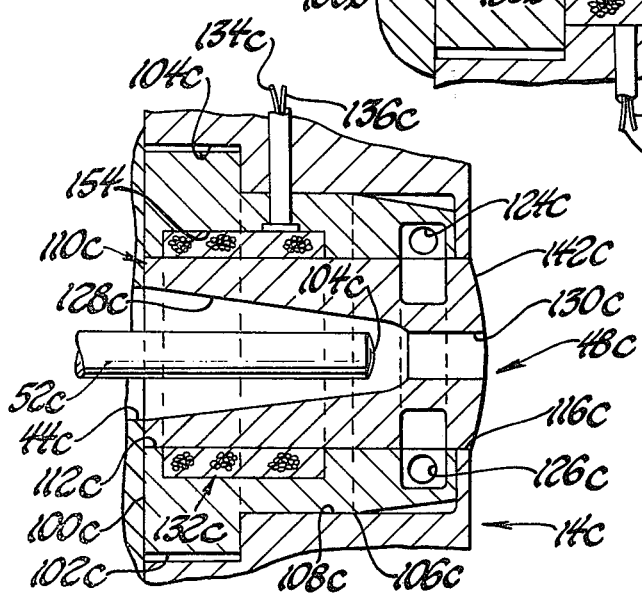
Fig. 3
Fig. 4
Fig. 5
Fig. 6

MOLD GATE APPARATUS

RELATED APPLICATION

This application is a continuation of my pending application Ser. No. 339,642, filed Mar. 12, 1973, for MOLD GATE APPARATUS now abandoned.

BACKGROUND OF THE INVENTION

The prior art has employed various methods and apparatus for the molding of plastic materials and the like. Generally, all such molding can be classified into two categories, one of which comprises the molding of thermosetting materials and the other of which comprises the molding of thermoplastic materials.

Both of such categories of molding, however, have, heretofore, experienced difficulties. For example, in the molding of any desired article, it is of obvious benefit to be able to mold such article, as a finished product, and eliminate the necessity of having to in any way expend additional manpower on such articles, in what may be referred to as "corrective" operations, upon the removal of such articles from the associated mold cavity; however, with one expensive exception, the prior art failed to provide either a method or apparatus which would produce such articles.

The problems of the prior art may be better understood from reference to the mold cavity itself. That is, as is well known, the cavity of the mold is formed so as to conform to the desired configuration of the finished molded article. However, the volume of such cavity is often difficult to compute especially when one considers that the material to be introduced into such cavity often undergoes expansion when so introduced and heated (in the case of thermosetting plastics) or cooled (in the case of thermoplastic materials).

Therefore, generally, in an attempt to make sure that upon each molding cycle there is sufficient molding material to fill the mold cavity, the prior art has resorted to the use of sprue type gates whereby a substantial quantity of molding material is ultimately molded integrally with the molded article in the form of an extending sprue. Upon removal of such molded article from the associated mold cavity the extending sprue carried thereby has to be removed as by a subsequent cutting operation. Not only is such a cutting operation costly, in that it does not contribute anything directly to the molding of such articles, but the material contained in the cut-off sprue is almost always totally wasted.

In some instances, especially where material costs are high, the prior art has atempted to avoid the necessity of first forming sprues and subsequently cutting them off, by, for example, weighing the constituent comprising the moldable material. That is, through an extensive and costly procedure of trial and error, the precise volume of moldable material required to adequately fill the cavity and mold the article therewithin is determined. This quantity is, in effect, weighed and from then, by injection, that (theoretically) exact same quantitiy of moldable material is injected into the related mold cavity to form the resulting molded article without the presence of an attendant sprue. The preceding method of weighing constituents is also often followed in what is commonly referred to in the art as compression molding.

Accordingly, it can be seen that the prior art, in attempting to avoid the costs of sprue formations has, in effect, employed molding methods which are often substantially as costly as the actual removal of formed sprues.

The invention as herein disclosed and described is primarily directed to the solution of the above as well as other related problems.

SUMMARY OF THE INVENTION

According to the invention a gating apparatus for use with a mold assembly comprises body means having passage means formed therein for receiving fuid plastic and directing such to an associated cavity of a mold assembly, first means for supplying a cooling medium to the body means, second means for supplying heat to said body means, and gate valving means for at times terminating the flow of such fluid plastic into the cavity of the mold assembly.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and elements may be omitted from one or more views:

FIG. 1 is a fragmentary view of a mold assembly, shown in combination with a typically schematically illustrated plastic injection machine, embodying the teachings of the invention;

FIG. 2 is an enlarged fragmentary portion of FIG. 1, illustrated in axial cross-section, showing in greater detail one particular embodiment of the invention;

FIG. 3 is a view similar to that of FIG. 2 but illustrating a modification of the invention shown in FIG. 2;

FIG. 4 is a view taken generally on the plane of line 4—4 of FIG. 3 and looking in the direction of the arrows;

FIG. 5 is a view similar to FIGS. 2 and 3 but illustrating another embodiment of the invention; and FIG. 6 is a view similar to either of FIGS. 2, 3 or 5 but illustrating yet another embodiment of the invention.

DETAILED DESCRIPTION OF THE PREFERRED EMBODIMENTS

Referring now in greater detail to the drawings, FIG. 1 illustrates, fragmentarily, a mold assembly 10, in its closed position, in operative combination with a plastic injection machine or means generally schematically depicted as at 12. As is generally well known in the art, the mold assembly 10 may be comprised of, for example, a movable male mold section 14 and a stationary female mold section 16.

In the embodiment illustrated, a plurality of cavities 18 and 20 are formed within the female mold section and adapted to respectively receive therein male core-like portions 22 and 24 carried by the male mold section 16 so as to thereby cooperatively define mold cavities 26 and 28 conforming to the shape of the articles to be molded which, for illustration, may be of a generally cup-shaped configuration.

The injection machine 12 may be comprised of suitable actuating means 30, 32, plastic supply means 34 and related control and/or timing means 36. Suitable plastic discharge conduit means 38, associated with said plastic supply means 34, is adapted to communicate with an inlet passage means 40 which, in turn, communicate with a plenum-like distribution conduit means 42 with such passage and conduit means 40 and 42 being formed generally in male mold section 14.

Conduit means 42, in turn, communicates with passage means 44 and 46 which are respectively controlled as by gating means 48 and 50 leading to mold cavities 26 and 28. Gating means 48 and 50 are respectively provided with gate shut-off pins or valving means 52 and 54 which, as will be disclosed in greater detail, serve to at times terminate flow of plastic material into mold cavities 26 and 28. Enlarged ends 56 and 58 of valving means 52 and 54 may be held, generally, between a movable plate-like member 60 and a retainer plate 62 secured thereto for movement therewith. In reality, gating means 48 and 50 may be identical to each other, as may be passage means 44, 46, and gate shut-off means 52, 54. Different reference numbers have been assigned primarily for ease of reference.

Plate 60, as through pins or rods 64 and 66 and associated actuating means 30 and 32 is adapted to at times move from the position illustrated (corresponding to an open position of the gate shut-off means 52, 54) to the right thereby moving the gate shut-off means 52, 54 to their closed position.

Suitable water supply means 68 is illustrated as having main supply conduit means 70 with branch supply conduits 72, 74 and 76 communicating therewith and respectively leading to conduit means 78, 80 and 82 formed in the mold section 14. A main return conduit 84 has branch return conduits 86, 88 and 90 communicating therewith and respectively leading from conduit means 92, 94 and 96 formed in the mold section 14. Such water supply means 68, especially depending on the nature of the plastic material being molded, may be employed to either regulate the temperature of the mold cavities by either supplying a fluid cooling medium or a fluid heating medium.

FIG. 2 illustrates, in greater detail, one preferred embodiment of a mold gating apparatus 48 embodying the teachings of the invention. As illustrated, the apparatus 48 may be comprised of an outer generally annular body 100 preferably provided with an annular radiating flange 102 which can be received within an annular recess 104 formed as within portion 13 of mold section 14 and contained therein as by a cooperating plate member 15, also comprising a portion of mold section 14. The body 100 may be provided with an axially extending body portion 106 slidably received within a cooperating recess 108 formed in mold portion 13.

An inner generally tubular body means 110 is closely received within and through cooperating apertures 112 and 114 of body 100 so as to extend into an aperture 116 formed in mold portion 13. As indicated, inner body means 110 may be formed of two separate portions 118 and 120, which may be secured to each other as by, for example, brazing, with portion 120 preferably being of a material of a comparably higher rate of thermal conductivity than portion 120. Inner body means 110 may be suitably secured to housing 102 in any suitably manner such as, for example, welding or brazing in order to thereby define the radially inner wall of annular chamber 122. A pair of conduit portions 124 and 126, formed in housing 102, serve to communicate between chamber 122 and, for example, conduits 92 and 78 leading to the water supply means 68.

Inner housing or body means 110 has a preferably tapered passage 128 which, at one end, communicates with passage 44 and, at its other end, with a gate passage or conduit 130 which communicates as with the mold cavity 26.

Heating means 132, such as, for example, an electrical resistance coil assembly, is situated generally about inner body means 110 and forwardly or near the discharge end thereof. Electrical conductors 134 and 136 are adapted for electrical connection to a suitable source of electrical potential 138.

OPERATION OF INVENTION

For purposes of illustration let it be assumed that the plastic material to be injected is of the thermosetting type. This means, of course, that before the plastic fluid material will in any way set, it must be heated to some predetermined minimum elevated temperature.

With the above being assumed and with the mold assembly of FIG. 1 being in its closed position, the plastic material would be supplied from 34 through 38 and into passage 40 from where it would flow into manifold 42 and into individual passages 44 and 46. (Only the operation of gating means 48 will be described since the operation of gating means 50 would be the same.)

Plate 60 would be in the position illustrated thereby holding gate valve means 52 in the open position, as shown in each of FIGS. 1 and 2, thereby permitting flow of fluid plastic from passage 44, into and through passages or conduits 128 and 130 and finally into mold cavity 26. When a sufficient amount of such plastic is supplied into cavity 26, actuator plates 60 and 62, as by actuating means 30, 32, move to the right causing gate valve means 52 to correspondingly move to the right. Such movement continues until end 140 of gate valve 52 passes into passage 130 and assumes a position generally coextensive with forward surface 142 of the end of inner body means 110.

The thermosetting plastic filling the cavity 26 is permitted to set and the mold assembly 10 then opened to permit withdrawal of the formed plastic article. Before the next plastic injection portion of the cycle is repeated, gate valve menas 52 is again withdrawn to thereby open passage means 130.

As was previously stated, in this instance it was assumed that the fluid plastic material was thermosetting. Accordingly, in order to first assure the continued fluidity of such plastic material passing through gating means 48, water supply means 68 would be a source of relatively cool water which would be supplied as via conduit means 70, 72 and 78 to conduit 126 of gating means 48. The water thusly supplied would circulate within the annular chamber 122 and exit through conduit means 124 and return as to source 68 via conduit means 92, 86 and 84. In the process of circulating within chamber 122, the water (or any other suitable coolant) would maintain the temperature of the surface of conduit 128 sufficiently low as to prevent the fluid plastic flowing therethrough from experiencing any setting action.

However, the heating means 132 is, at the same time, effective for keeping the forwardmost portion of the gating means 48, including surface 142, at the proper setting temperature of the particular plastic material being employed. Therefore, as soon as the gate valve is closed, as previously described, the forward or leading end of valve 52 comes into heat transferring contact with the forward end of inner body means 110 and thereby quickly reaches the setting temperature. Consequently, the mold article is molded across surface 142 and coextensive surface 140 of the closed gate valve 52 thereby eliminating any sprue formation on such molded article.

At this point it should be pointed out that surface 142 need not be crowned or convex as illustrated and may, in fact, be any suitable configuration as is deemed appropriate for the particular article being molded.

FIG. 3 illustrates a modification of the structure shown in FIG. 2. All elements in FIG. 3 which are like or similar to those of FIG. 2 are identified with like reference numbers provided with a suffix a.

In comparing FIGS. 2 and 3, it can be seen that in the embodiment of FIG. 3, the heating means 132a is placed more at the axial midpoint of the gating means 48a and is annularly situated generally about outer housing 100a and radially confined by surfaces 106a and 108a. The overall operation is that as described with reference to FIG. 3 and for purposes of illustration the primary path of flow of heat from heating means 132a to the forward end of the gating means 48a is depicted as by the heavy dash lines 146.

FIG. 5 illustrates a second embodiment of the invention. All elements in FIG. 5 which are like or similar to those of FIGS. 2 or 3 are identified with like reference numbers provided with a suffix b.

In comparing for example FIG. 3 and FIG. 5, it can be seen that the embodiment of FIG. 5 differs principally by having inner body means 110b formed of a single piece provided with a radiating flange 148 which axially abuts against an annular surface 150 carried by the outer housing 100b. Again, the mode of operation of the embodiment of FIG. 5 is like that described with reference to FIG. 2 and the path of travel of heat as generated by the heating means 132b would be, as that generally depicted by the heavy dash lines 146 of FIG. 3, through the generally conical portion 152.

The embodiments of FIGS. 2, 3 and 5 have been described with reference to the assumed injection of a plastic material which is thermosetting. The embodiment of FIG. 6 is presented as being generally illustrative of a gating apparatus employing the same inventive concepts, as apply to the preceding embodiments, for a gating apparatus employed wherein thermoplastic material is to be injected. In FIG. 6, all elements which are like or similar to those of either FIGS. 2, 3 or 5 are identified with like reference numbers provided with a suffix c.

In considering the embodiment of FIG. 6, it should be remembered that the considerations of heating and cooling are basically reversed with respect to the preceding embodiments. That is, the fluid plastic passing through conduit 128c must be maintained at a relatively elevated temperature to prevent any setting action from occurring at that location.

Accordingly, the heating means is located as within an annular chamber 154 nearer the inlet end of conduit 128c while the cooling means is situated nearer the forward or discharge end. That is, an annular chamber 122c may be formed by cooperating juxtaposed annular recesses 156 and 158 formed in outer housing 100c and inner body means 110c.

Although only a select number of preferred embodiments of the invention have been disclosed and described, it is apparent that other embodiments and modifications of the invention are possible within the scope of the appended claims.

I claim:

1. A mold gate insert assembly, comprising insert body means having an inlet end and an outlet end, axially extending passage means formed through said insert body means and having an inlet opening formed in said inlet end and an outlet opening formed in said outlet end, said passage means being effective for enabling the flow therethrough of moldable material from an associated source of said material to an associated mold cavity, said insert body means comprising first and second insert body sections, one of said insert body sections being received by the other of said insert body sections and being sealingly secured to each other, chamber means defined by at least one of said first and second insert body sections as to be situated generally radially outwardly of said passage means and effective to carry therethrough fluid coolant means so as to thereby create a cooling effect along a first axially extending zone of said passage means, and generally annular electrical heating means carried by said insert body means and situated generally radially outwardly of said passage means so as to thereby create a heating effect along a second axially extending zone of said passage means, said chamber means and said heating means being spaced from each other as to have a portion of said insert body means generally therebetween, said first insert body section being of a sleeve-like configuration, said second insert body section having at least a portion thereof closely received within said first insert body section, said first insert body section having an axial end surface, said second insert body section comprising an annular radially extending flange surface, said flange surface being adapted to be in sealingly fixed engagement with said axial end surface, and said heating means being situated generally radially outwardly of said chamber.

2. A mold gate insert according to claim 1 wherein at least two of said insert body sections are formed of like material.

3. A mold gate insert according to claim 1 wherein the distance required for heat to travel from said passage means to said chamber means is less than the distance required for heat to travel from said heating means to said passage means.

4. A mold gate insert according to claim 1 wherein said first zone is located relatively axially closer to said inlet end, and wherein said second zone is located relatively axially closer to said outlet end.

5. A mold gate insert according to claim 1 wherein said first zone is located relatively axially closer to said outlet end, and wherein said second zone is located relatively closer to said inlet end.

6. A mold gate insert assembly, comprising insert body means having an inlet end and an outlet end, axially extending passage means formed through said insert body means and having an inlet opening formed in said inlet end and an outlet opening formed in said outlet end, said passage means being effective for enabling the flow therethrough of moldable material from an associated source of said material to an associated mold cavity, said insert body means comprising first and second insert body sections, one of said insert body sections being received by the other of said insert body sections and being sealingly secured to each other, chamber means defined by at least one of said first and second insert body sections as to be situated generally radially outwardly of said passage means and effective to carry therethrough fluid coolant means so as to thereby create a cooling effect along a first axially extending zone of said passage means, and generally annular electrical heating means carried by said insert body means and situated generally radially outwardly of said passage means so as to thereby create a heating effect along a second axially extending zone of said passage means, said chamber means and said heating means being spaced from each other as to have a portion of said insert body means generally therebetween, said first insert body section being generally annular in axially transverse cross-section, said second insert body section being generally annular in axially transverse cross-section, said first insert body section having an outer first generally cylindrical surface, said second insert body section comprising inner second generally cylindrical surface means, said first outer cylindrical surface being closely received within said second cylindrical surface means and sealingly secured thereto, said second insert body section comprising outer third surface means, said electrical heating means being carried by said third surface means, and said second insert body section further comprising a flange-like portion effective for abutting against associated mold assembly abutment means for retaining said insert body means in assembled relationship thereto.

7. A mold gate insert according to claim 6 wherein said first and second insert body sections are formed of like material.

8. A mold gate insert according to claim 6 and further comprising second generally radially extending flange means carried by said first insert body section, wherein said flange-like portion is carried generally at one axial end of said second insert body section, said second flange means being in abutting and sealing engagement with said second insert body section at an end thereof opposite to said flange-like portion.

9. Mold gate apparatus, comprising housing means having an inlet end and an outlet end, said housing means being adapted to be received within an associated mold assembly, first axially extending conduit means formed through said housing means as to have one end thereof opening in said inlet end of said housing means and an other end thereof opening in said outlet end of said housing means, said first conduit means being effective to transmit therethrough fluid moldable material entering said first conduit means at said one end and exiting said first conduit means at said other end, a coolant chamber formed in said housing means, second and third conduit means formed in said housing means communicating with said chamber and adapted for communication with a related source of coolant, electrical heating means situated generally about said housing means radially outwardly of said first conduit means and adapted for electrical connection to a related source of electrical potential, said coolant chamber and said electrical heating means being spaced from each other as to thereby respectively define spaced zones of cooling and heating axially along said housing means and said first conduit means, and gate valving means in said first conduit means adapted to at times terminate flow of said moldable material through said first conduit means by being closely received at least partially within said first conduit means and positioned so as to have at such times an end surface thereof generally coextensive with said outlet end of said housing means, said housing means comprising a first outer sleeve-like housing member and a second generally tubular inner housing member closely received within and sealingly secured to said outer housing member, said first conduit means being formed through said inner housing member, and said coolant chamber being cooperatively defined by at least portions of said outer housing member and said inner housing member.

10. Mold gate apparatus according to claim 9 wherein said second generally tubular inner housing member comprises first and second separate housing body sections fixedly and sealingly secured to each other as to have said first conduit means extend through each of said first and second housing body sections.

11. Mold gate apparatus according to claim 9 wherein said spaced zones comprise a first cooling zone and a second heating zone, wherein said first cooling zone is located relatively axially closer to said inlet end, and wherein said second heating zone is located relatively axially closer to said outlet end.

12. Mold gate apparatus according to claim 9 wherein said spaced zones comprise a first cooling zone and a second heating zone, wherein said first cooling zone is located relatively axially closer to said outlet end, and wherein said second heating zone is located relatively axially closer to said inlet end.

13. Mold gate apparatus, comprising housing means having an inlet end and an outlet end, said housing means being adapted to be received within an associated mold assembly, first axially extending conduit means formed through said housing means as to have one end thereof opening in said inlet end of said housing means and an other end thereof opening in said outlet end of said housing means, said first conduit means being effective to transmit therethrough fluid moldable material entering said first conduit means at said one end and exiting said first conduit means at said other end, a coolant chamber formed in said housing means, second and third conduit means formed in said housing means communicating with said chamber and adapted for communication with a related source of coolant, and electrical heating means situated generally about said housing means radially outwardly of said first conduit means and adapted for electrical connection to a related source of electrical potential, said coolant chamber and said electrical heating means being spaced from each other as to thereby respectively define spaced zones of cooling and heating axially along said housing means and said first conduit means, said first conduit means being adapted to at least partly receive therein associated gate valving means relatively axially movable with respect to said first conduit means as to thereby be effective for terminating flow of said fluid moldable material through said outlet end, said housing means comprising a first outer sleeve-like housing member and a second generally tubular inner housing member closely received within and sealingly secured to said outer housing member, said first conduit means being formed through said inner housing member, and said coolant chamber being cooperatively defined by at least portions of said outer housing member and said inner housing member.

14. A mold gate insert assembly, comprising insert body means having an inlet end and an outlet end, axially extending passage means formed through said insert body means and having an inlet opening formed in said inlet end and an outlet opening formed in said outlet end, said passage means being effective for enabling the flow therethrough of moldable material from an associated source of said material to an associated mold cavity, said insert body means comprising first and second insert body sections, one of said insert body sections being received by the other of said insert body sections and being sealingly secured to each other, chamber means defined by at least one of said first and second insert body sections as to be situated generally radially outwardly of said passage means and effective to carry therethrough fluid coolant means so as to thereby create a cooling effect along a first axially extending zone of said passage means, and generally annular electrical heating means carried by said insert body means and situated generally radially outwardly of said passage means so as to thereby create a heating effect along a second axially extending zone of said passage means, said chamber means and said heating means being spaced from each other as to have a portion of said insert body means generally therebetween, said insert body means further comprising a third insert body section fixedly and sealingly secured to one of said first and second insert body sections, and said passage means extending through said one of said insert body sections and said third insert body section.

* * * * *